(12) United States Patent
Sagesaka et al.

(10) Patent No.: US 9,061,468 B2
(45) Date of Patent: Jun. 23, 2015

(54) WELDING METHOD AND WELDING APPARATUS

(75) Inventors: Yuji Sagesaka, Shizuoka (JP); Masakazu Sato, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 13/425,209

(22) Filed: Mar. 20, 2012

(65) Prior Publication Data

US 2012/0241424 A1 Sep. 27, 2012

(30) Foreign Application Priority Data

Mar. 22, 2011 (JP) ................................. 2011-061981

(51) Int. Cl.
- *B23K 26/00* (2014.01)
- *B29C 65/00* (2006.01)
- *B29C 65/16* (2006.01)
- *B29L 31/00* (2006.01)

(52) U.S. Cl.
CPC ......... *B29C 66/301* (2013.01); *B29L 2031/747* (2013.01); *B29K 2995/0031* (2013.01); *B29C 65/1635* (2013.01); *B29C 65/1661* (2013.01); *B29C 65/1677* (2013.01); *B29C 65/1687* (2013.01); *B29C 66/1222* (2013.01); *B29C 66/1224* (2013.01); *B29C 66/131* (2013.01); *B29C 66/542* (2013.01); *B29C 66/8122* (2013.01); *B29C 66/81267* (2013.01); *B29C 66/81266* (2013.01)

(58) Field of Classification Search
USPC ................ 219/121.61–121.64; 362/310, 267; 156/272.8; 439/676, 226; 385/93; 29/592.1

See application file for complete search history.

(56) References Cited

U.S. PATENT DOCUMENTS

| | | | |
|---|---|---|---|
| 7,575,495 B2 * | 8/2009 | Yamazaki et al. | 445/27 |
| 7,637,644 B2 * | 12/2009 | Yamamoto | 362/546 |
| 2003/0072542 A1 * | 4/2003 | Furuichi et al. | 385/93 |
| 2003/0196750 A1 * | 10/2003 | Sakai et al. | 156/272.8 |
| 2005/0030751 A1 * | 2/2005 | Matsunaga et al. | 362/267 |
| 2005/0284851 A1 * | 12/2005 | Enoki et al. | 219/121.64 |
| 2006/0134994 A1 * | 6/2006 | Yasuda et al. | 439/676 |
| 2007/0081352 A1 * | 4/2007 | Yamamoto | 362/509 |
| 2009/0115111 A1 * | 5/2009 | Oonishi | 264/482 |
| 2009/0252978 A1 * | 10/2009 | Katayama et al. | 428/457 |
| 2009/0294417 A1 * | 12/2009 | Spennemann et al. | 219/121.64 |

FOREIGN PATENT DOCUMENTS

| | | |
|---|---|---|
| CN | 1788987 A | 6/2006 |
| CN | 101793981 A | 8/2010 |
| JP | P2004-66739 A | 3/2004 |

(Continued)

*Primary Examiner* — Dana Ross
*Assistant Examiner* — Renee L Miller
(74) *Attorney, Agent, or Firm* — DLA Piper LLP (US)

(57) ABSTRACT

A welding technique closely contacting a light transmissive second member to a first member and radiating deflection-controlled laser light from a second member side to weld both first and second members at a weld interface thereof. A reflectance reducing means is formed by an incident angle adjusting step provided in a cover plate that is disposed on a light radiating surface side of the second member. The reflectance reducing means reduces incident angles of the light at the light radiating surfaces of the first and second members, thus reducing the reflection loss of the laser light at the light radiating surfaces and improving the welding efficiency.

6 Claims, 4 Drawing Sheets

(56) References Cited

FOREIGN PATENT DOCUMENTS

| | | |
|---|---|---|
| JP | 2005-254618 | 9/2005 |
| JP | 2009-56755 A | 3/2009 |
| JP | 2009-248322 A | 10/2009 |
| WO | WO 2007/063751 A | 6/2007 |

* cited by examiner

WELDING METHOD AND WELDING APPARATUS

BACKGROUND OF THE INVENTION

1. Field of the Invention

The present invention relates to a welding method and a welding apparatus that are capable of increasing welding efficiency when light such as laser light is radiated to weld an object to be processed.

2. Description of the Related Art

As part of the process to manufacture a vehicular lamp, there is a process that fixedly attaches in an integrated manner a transparent front cover to a container-like lamp body, and welding is used in this process to fixedly attach the front cover to the lamp body. When a lamp housing is configured, for example as shown in FIG. 1, from a container-like lamp body 1 whose front surface has an opening, and a transparent front cover 2 that is made of resin and is fixedly attached to cover the front opening of the lamp body 1, a flange 3 is formed along the peripheral edge of the front opening of the lamp body 1, and this front surface of the flange 3 is brought into closely contact with the inner surface of the peripheral edge portion 4 of the front cover 2 (all indicated by stippling in FIG. 1), and then the lamp body 1 and the front cover 2 are welded and integrated together so that the closely contacting surfaces serve as a weld interface.

For such welding, in the presser tool and welding method of Japanese Patent Application Laid-Open (Kokai) No. 2009-56755, a front cover formed of a light transmissive resin is placed in a state of contact over the front opening of a lamp body formed of a light absorbing resin, and laser light is radiated from the outer side of the front cover toward the surfaces to be welded (called "weld interface"), so that the light energy of the laser light melts the weld interface to weld both together. This welding process requires that the laser light be radiated along the weld interface, and Japanese Patent Application Laid-Open (Kokai) No. 2005-254618 proposes an art that scans laser light along the weld interface by controlling the laser light for deflection using an XY two-axis rotating mirror unit, i.e., a so-called galvano mirror device.

The welding apparatus shown in FIG. 2 is used as an example of a welding apparatus that uses the art of Japanese Patent Application Laid-Open (Kokai) Nos. 2009-56755 and 2005-254618 to manufacture lamp housings of vehicular lamps. This welding apparatus includes a light deflecting device 10 that deflects laser light emitted from a laser light source 11 in any direction using light deflecting means 12 such as a galvano mirror. The welding apparatus further includes a work mount 13 on which a lamp body 1, which is an object to be welded, is disposed with the front opening facing upward. A front cover 2 is placed on the disposed lamp body 1, and a cover plate 14 is provided on the front cover 2. The cover plate 14 presses the front cover 2 downward, so that the peripheral edge portion 4 of the front cover 2 contacts the flange 3 of the front opening of the lamp body 1. Laser light L controlled for deflection by the laser deflecting device 10 is radiated and also scanned along the flange 3 of the lamp body 1. The laser light L consequently passes through the cover plate 14 and also passes through the front cover 2 and is radiated to the weld interface so that the lamp body 1 and the front cover 2 are welded together at the weld interface.

In this welding apparatus, the laser light L is radiated a plurality of times at high speed to the entire weld interface, and high-quality welding for simultaneously welding the entire periphery of the weld interface is achieved in a short time.

In the welding apparatus that uses the light deflecting device described above, the laser light is controlled for deflection (or merely "deflected") by the laser deflecting device 10, whose position is fixed within the welding apparatus, so as to be radiated to the weld interface. Therefore, the incident angle of the laser light with respect to the weld interface may vary depending on the difference in the position of the weld interface relative to the light deflecting device 10.

More specifically, vehicular lamps in recent years often employ shapes that wrap around toward the vehicle side based on design requirements, and as a consequence, the weld interface of the front cover and the lamp body is not all positioned on the same plane. In addition, this increases the incident angle of the laser light with respect to weld interface that is at locations far from the light deflecting device 10. Therefore, at locations where the incident angle is large, the reflectance of the laser light at the top surface of the cover plate 14 and the top surface of the front cover 2 also increases, and the amount of laser light that passes through the front cover 2 and is radiated to the weld interface is reduced, i.e., reflection loss becomes significant. This relationship between the incident angle and reflectance is already known in, for example, the optical field, and it is recognized that reflectance sharply increases once the incident angle starts to exceed a predetermined angle (this predetermined angle is an angle near the so-called Brewster's angle and varies depending on the refractive index of the material; the predetermined angle is 40 to 60 degrees for glass with a refractive index of around 1.5). Such reflectance loss causes a significant reduction in welding efficiency at the weld interface by laser light and creates the problems of increased welding time and difficulty in obtaining a high-quality weld. In particular, for a lamp housing that includes a wraparound portion so as to comply with a vehicular lamp that has a wraparound shape as described above, the incident angle of the laser light at the wraparound portion often exceeds the predetermined angle and results in significant reflection loss.

BRIEF SUMMARY OF THE INVENTION

It is, therefore, an object of the present invention to provide a welding method and a welding apparatus that are capable of reducing the reflection loss of radiated light that is controlled for deflection, thus realizing welding with high welding efficiency.

The above-described object is accomplished by unique steps of the present invention for a welding method that closely contacts a light transmissive second member to a first member and radiates light, that is controlled for deflection by a light deflecting device, from a second member side so as to weld together both members at the closely contacting surfaces, and in the present invention the reflectance of the light being radiated to the second member is reduced by a reflectance reducing means disposed on a light receiving surface side of the second member.

The above-described object is also accomplished by a unique structure of the present invention for a welding apparatus that includes a means for holding a first member and a light transmissive second member in a close contact state, and a light deflecting means for controlling light emitted from a light source for deflection and radiating the deflected light to the closely contacting surfaces from a second member side, and in the present invention, the welding apparatus further includes a reflectance reducing means which is for reducing the reflectance of the radiated light and disposed on the light receiving surface side of the second member.

In the above-described welding method and apparatus of the present invention, the reflectance reducing means is configured by an optical step that reduces an incident angle of the light entering the closely contacting surfaces of the first and second members, and alternatively, the reflectance reducing means can be configured by laminating a plurality of light transmissive members having different refractive indices. The reflectance reducing means of the present invention is preferably formed in a pressing means that is for closely contacting the second member to the first member.

According to the present invention, the light radiated to a weld interface formed by first and second members is reduced, by a reflectance reducing means, in its reflectance that is until the light is radiated to the second member, so that a reflection loss of the light being radiated to the second member can be reduced and highly efficient welding can be performed.

DETAILED DESCRIPTION OF THE INVENTION

Figure 1:
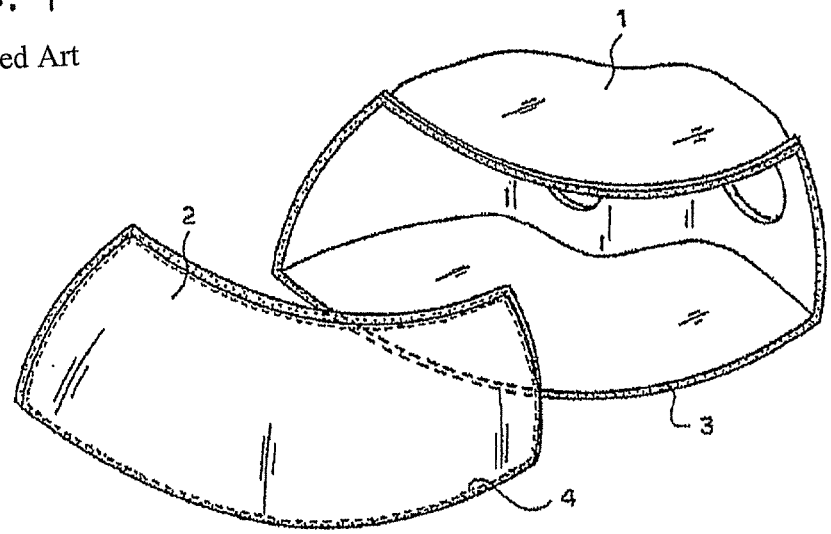
FIG. 1 is a perspective view of an example of a lamp housing to which the present invention is applied.
Figure 2:
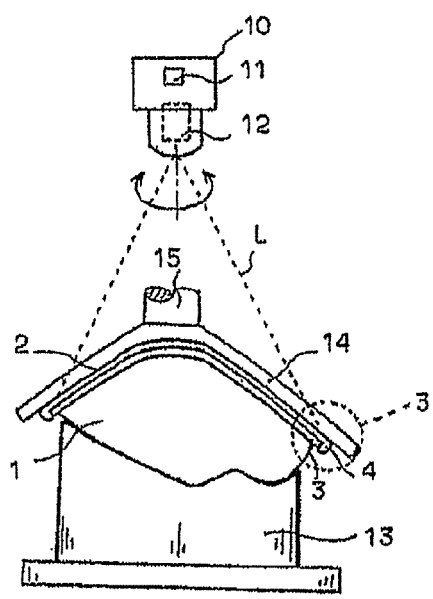
FIG. 2 is a conceptual configuration diagram that shows the overall configuration of a welding apparatus.

Hereinafter, embodiments of the present invention will be described with reference to the accompanying drawings. As shown in FIG. 2, an embodiment of the present invention will be described with reference to an example in which laser light is controlled for deflection by a light deflecting device 10 so as to weld together a lamp body 1 and a front cover 2 of a vehicular lamp that serve as objects to be processed.

More specifically, the light deflecting device 10 of a welding apparatus includes a laser light source 11, and laser light emitted from the laser light source 11 is controlled so as to be deflected a by light deflecting means 12 such as a galvano mirror and radiated and while being scanned at high speed in any planar or horizontal direction. A galvano mirror will not be described further here since it is commonly known.

The lamp body 1 subjected to welding is fixed on a work mount 13 of the welding apparatus with its front opening facing upward. The front cover 2 to be welded to the lamp body 1 is placed on the lamp body 1. At least a portion of the flange 3 subjected to welding of the lamp body 1 is configured from a light absorbing resin that can be heated and melted by laser light. For example, a resin that includes a light absorbing material such as carbon is preferably used. The front cover 2 is configured from a light transmissive transparent resin, and in more detail it is configured from a resin that can be melted by the heat of radiated light. The inner surface of a peripheral edge portion 4 of the front cover 2 is positioned on the front surface of the flange 3 of the lamp body 1, and the front cover 2 is pressed by a cover plate 14 against the lamp body 1, whereby the front surface of the lamp body 1 and the inner surface of the front cover 2 are placed in a contact each other.

First Embodiment

In the welding apparatus of the structure described above, according to the first embodiment of the present invention, a portion of the cover plate 14 provided in the front cover 2 configures a reflectance reducing means. The reflectance reducing means has a function that reduces an incident angle of laser light L, emitted from the light deflecting device 10 when the laser light L is radiated to the outer surface of the front cover 2, to less than the predetermined angle previously described, in this case, to less than 40 degrees. The cover plate 14 has a similar function as heretofore described for pressing the front cover 2 against the lamp body 1.

A stem 15 is provided on a portion of the cover plate 14 and is connected to a pressing mechanism not shown in the figure, whereby the cover plate 14 presses the front cover 2 toward the lamp body 1 when the pressing mechanism is operated, and adhesion is secured at a weld interface of the flange 3 of the lamp body 1 and the peripheral edge portion 4 of the front cover 2 to realize suitable welding.

Figure 3:
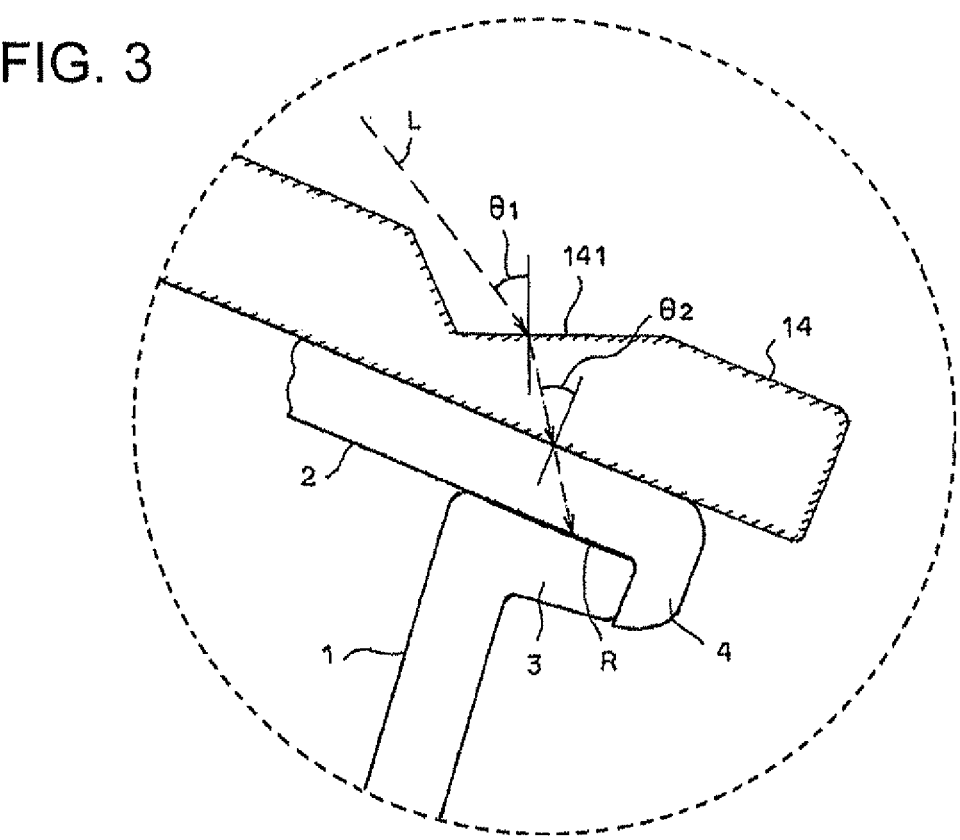
FIG. 3 is an enlarged cross-sectional view of an essential portion, encircled in FIG. 2 with a reference numeral 3, of a cover plate according to a first embodiment of the present invention.

FIG. 3 is an enlarged cross-sectional view of an essential portion of the cover plate 14 that corresponds to the circled portion 3 in FIG. 2 where the reflectance reducing means of the present invention is provided. The cover plate 14 is comprised of a transparent material that has high light transmissive and low light absorbing properties with respect to laser light used for welding, such as acrylic resin, polycarbonate (PC) resin, and glass (e.g., silica glass), and it is a plate-shaped member with a substantially uniform thickness. Here, the refractive index of the cover plate 14 with respect to the laser light is equal to a refractive index of the front cover 2 in order to simplify the following description.

An incident angle adjusting step 141 that is the reflectance reducing means of the first embodiment of the present invention is formed in the cover plate 14 along the weld interface R, i.e., an area where the flange 3 of the lamp body 1 and the peripheral edge portion 4 of the front cover 2 are in close contact. The incident angle adjusting step 141 is configured as a tapered portion that is formed by providing a recess in the outer surface of the cover plate 14 and inclines in the plate thickness direction. The outer surface of the tapered portion inclines in a direction starting from the outer surface of the cover plate 14 toward the light deflecting device 10. Due to this inclination, the incident angle adjusting step 141 reduces the incident angle of the laser light L when the laser light L emitted from the light deflecting device 10 enters the incident angle adjusting step 141, and further the incident angle adjusting step 141 refracts and emits the incident laser light L downward in the figure.

When the lamp body 1 and the front cover 2 are welded together by the welding apparatus that includes the cover plate 14, the lamp body 1 is, as previously described, set on the work mount 13 of the welding apparatus shown in FIG. 2, and the front cover 2 is placed on the lamp body 1, and then the cover plate 14 provided on the upper side of or above the front cover 2 is pressed against the front cover 2 such that the front cover 2 closely contacts the lamp body 1. At this time, the incident angle adjusting step 141 provided in the cover plate 14 is positioned so as to face the weld interface R of the lamp body 1 and front cover 2.

The light deflecting device 10 is then driven to deflect the laser light from the laser light source 11 using the galvano mirror 12. As a result, the laser light L emitted from the light deflecting device 10 is radiated toward the weld interface R while being scanned along the weld interface R. The radiated laser light L is radiated toward an incident surface of the incident angle adjusting step 141 of the cover plate 14, and the laser light L is refracted at the incident surface, after which the laser light L passes through and is emitted from the incident angle adjusting step 141. The laser light L then enters the outer surface of the front cover 2, passes through the front cover 2, and radiates to the weld interface R of the front cover 2 and lamp body 1, whereby welding is performed.

As shown in FIG. 3, the incident surface of the incident angle adjusting step 141 is inclined toward the light deflecting device 10. Therefore, the incident angle θ1 of the laser light L entering the incident angle adjusting step 141 is smaller than the incident angle of the laser light L when the incident angle adjusting step 141 is not formed. Moreover, the incident angle adjusting step 141 has a cross section of a tapered shape. Therefore, the exit angle of the laser light L emitted from the inner surface of the incident angle adjusting step 141, i.e., the incident angle θ2 of the laser light L when entering the outer surface of the front cover 2, is also smaller.

Figure 4:
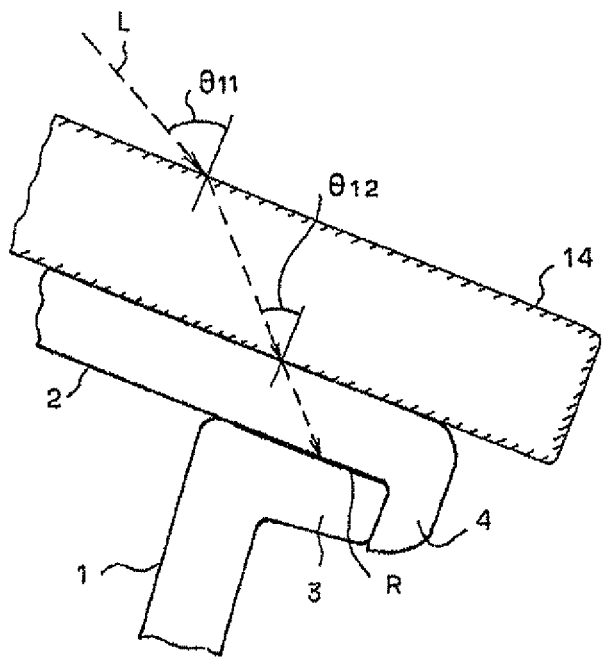
FIG. 4 is an enlarged cross-sectional view for explaining the operation of the first embodiment.

More specifically, when, as seen from FIG. 4 a cover plate 14 that has no incident angle adjusting step provided is used, it is clear that the incident angle θ11 of laser light L with respect to the cover plate 14 and the incident angle θ12 of the laser light L with respect to the front cover 2 are both larger than the incident angles θ1, θ2 shown in FIG. 3. As described above, the reflectance at an incident surface when light enters a substance is closely related to the incident angle of light at the incident surface. In particular, the reflectance sharply increases when the incident angle exceeds a predetermined angle as described above. Accordingly, using the incident angle adjusting step 141 as in the present embodiment in which the incident angle θ1 for the laser light entering the cover plate 14 and the incident angle θ2 for the laser light entering the front cover 2 are both set smaller than a predetermined angle, it is possible to lower the reflectance of the incident light and reduce the reflection loss, and as a result to increase the transmission property of the laser light L through the cover plate 14 and the front cover 2. This benefits both the light energy of the laser light L that reaches the weld interface R of the lamp body 1 and front cover 2 and the welding efficiency to increase, thus realizing a shorter welding time and improved welding quality.

According to the simulation performed by the inventors, when, in the case of the cover plate of FIG. 4 with no incident angle adjusting step, the laser light had an incident angle of 25 degrees with respect to the incident surface of the cover plate 14 and an incident angle of 45 degrees at the weld interface with respect to the normal direction, then the transmission efficiency of the laser light radiated to the weld interface was 45.8%. Meanwhile, when the inclination angle at the incident surface of the incident angle adjusting step 141 in FIG. 3 was 45 degrees, in other words, when the cover plate 14 of FIG. 3 was used with the incident surface thereof facing a direction perpendicular to the normal direction, the transmission efficiency of the laser light radiated to the weld interface R was 85.6%.

Figure 5:
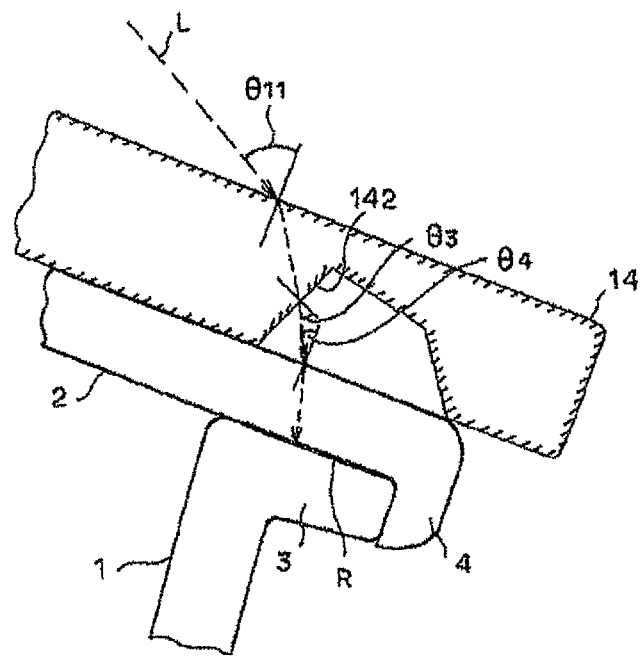
FIG. 5 is an enlarged cross-sectional view of the essential portion of the cover plate according to a first modification of the first embodiment.

FIG. 5 shows a first modification of the first embodiment, in which an incident angle adjusting step 142 is formed in the inner surface of a cover plate 14 as a reflectance reducing means.

More specifically, in an area of the cover plate 14 where the flange 3 of the lamp body 1 and the peripheral edge portion 4 of the front cover 2 face each other, the inner surface of the cover plate 14 is provided with a recess to form a tapered portion, so that the tapered portion serves as a light emitting surface of the incident angle adjusting step 142. In this structure, the light emitting surface is inclined at a large angle in a direction toward the light deflecting device 10. Thus, with regard to the laser light L entering the cover plate 14, though the incident angle θ11 for the laser light L entering the cover plate 14 is the same as the incident angle θ11 shown in FIG. 4, the exit angle θ3 for the laser light L being emitted from the incident angle adjusting step 142 increases toward the front cover 2 side. Accordingly, the incident angle θ4 for the laser light L entering the outer surface of the front cover 2 from the incident angle adjusting step 142 is smaller than the incident angle θ12 in FIG. 4. As a result, the reflection loss at the outer surface of the front cover 2 can be reduced and the light energy of the laser light at the weld interface R can be increased, thus increasing the welding efficiency.

In the simulation of the present embodiment, when the inclination angle at the emitting surface of the incident angle adjusting step 142 was 30 degrees, the transmission efficiency of the laser light radiated to the weld interface R was 80.9%.

Figure 6:
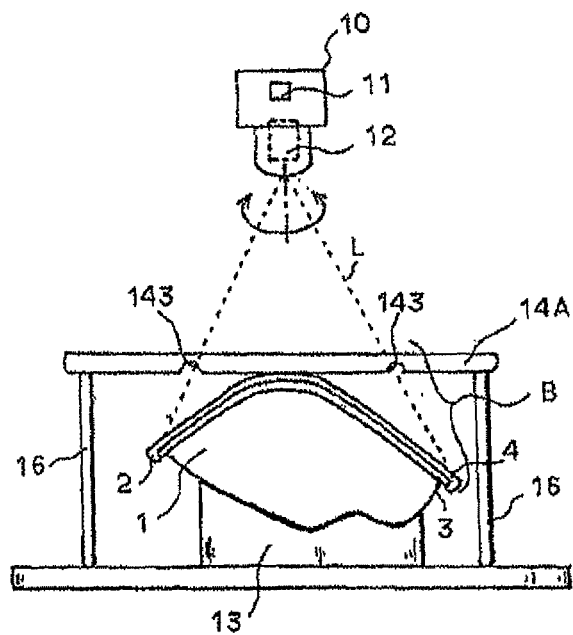
FIG. 6 is a conceptual configuration diagram of the welding apparatus according to a second modification of the first embodiment of the present invention.

FIG. 6 shows a welding apparatus according to a different, i.e., second, modification of the first embodiment. Portions identical to those in FIG. 2 are indicated by like reference numerals.

This welding apparatus of FIG. 6 is configured such that a cover plate 14A is formed as a light transmissive plate shaped in a flat plate. When the cover plate 14A is moved downward to press the lamp body 1 and the front cover 2 placed on the work mount 13, the cover plate 14A presses the front cover 2 downward while making a partial contact with the upper surface of the front cover 2.

The cover plate 14A is formed with an appropriate number of guide posts 16, which extend vertically downward, at peripheral positions to serve as guides for maintaining a predetermined orientation when the cover plate 14A presses the front cover 2. Similar to the example of FIG. 2, this welding apparatus includes the light deflecting device 10 that deflects and radiates the laser light emitted from the laser light source 11 in any direction using the light deflecting means 12 such as a galvano mirror.

Figure 7:
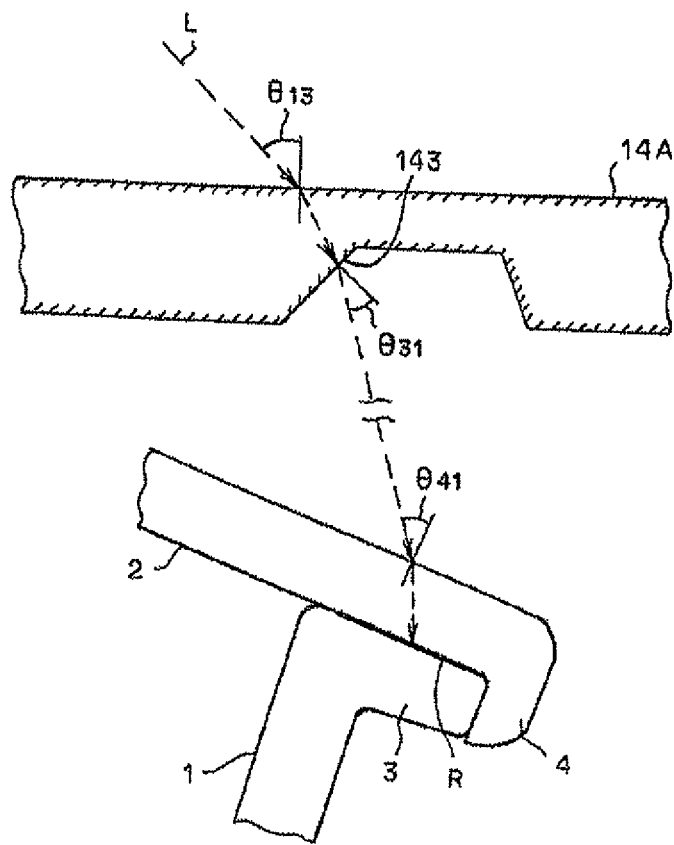
FIG. 7 is an enlarged cross-sectional view of the essential portion of the cover plate according to the second modification of the first embodiment.

FIG. 7 shows in an enlarged view the portion B in FIG. 6. The inner surface of the cover plate 14A is formed with an incident angle adjusting step 143 along an area facing the weld interface R where the lamp body 1 and the front cover 2 are in close contact. The incident angle adjusting step 143 is configured basically similar to the incident angle adjusting step 142 of the first modification of FIG. 5. More specifically, the inner surface of the cover plate 14A is provided with a recess to form a tapered portion, so that the tapered portion serves as a light emitting surface of the incident angle adjusting step 143. The light emitting surface is inclined in a direction toward the light deflecting device 10.

With the structure above, generally similar to the first modification, the incident angle θ13 for the laser light L entering the cover plate 14A is smaller than the incident angle θ11 shown in FIG. 4. In addition, after the laser light L is emitted at the exit angle θ31 from the angle adjusting step 143, the incident angle θ41 for this laser light L entering the outer surface of the front cover 2 is smaller than the incident angle θ12 in FIG. 4. Accordingly, the reflection loss at the outer surface of the front cover 2 can be reduced, and the light energy of the laser light at the weld interface R can be increased, thus increasing the welding efficiency.

In the structure of this second modification, the cover plate 14A partially contacts and presses the outer surface of the front cover 2. Therefore, the cover plate 14A can be configured as a flat plate, which facilitates manufacture of the cover plate 14A and enables the cover plate 14A to be manufactured at low cost.

In the first embodiment and the first modification thereof described above, the incident angle adjusting steps 141, 142 provided in the cover plate 14 carry a function for reducing the incident angle of the laser light L radiated to the front cover 2 when the laser light L enters the front cover 2. Accordingly, the cover plate 14 is only necessary to be disposed in the optical path of the laser light L radiated to the front cover 2, and the cover plate 14 does not need to directly contact the outer surface of the front cover 2, and it can be disposed separate from the outer surface of the front cover 2. In other words, as in the second modification, the cover plate 14 can be configured so as to partially contact and press a portion or a plurality of locations of the front cover 2.

Second Embodiment

Figure 8:
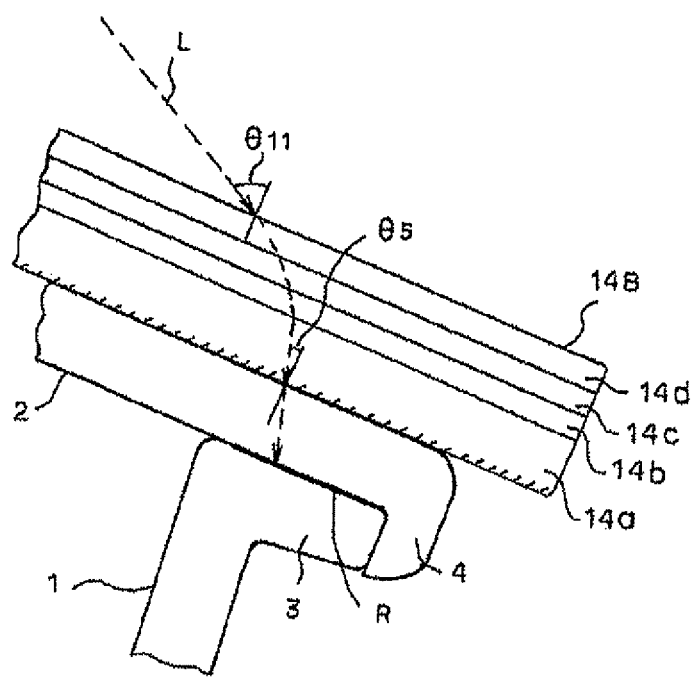
FIG. 8 is an enlarged cross-sectional view of the essential portion of the cover plate according to a second embodiment.

FIG. 8 is a cross-sectional view that shows a second embodiment of the present invention in which a cover plate 14B serves as a reflectance reducing means of the present invention.

In this second embodiment, the cover plate 14B is not provided with an incident angle adjusting step. Instead, a plurality of light transmissive thin films with different refractive indices are laminated by coating or the like onto a cover plate 14a that has a single-plate structure. More specifically, first, second, and third light transmissive films 14b, 14c, and 14d having successively smaller refractive indices nb, nc, nd (nb>nc>nd) in this order are laminated in a state of close contact. In this example, the refractive index nb of the first light transmissive film 14b is equal to the refractive indices of the cover plate 14a and front cover 2.

In this second embodiment, the incident angle θ11 of the laser light L entering the cover plate 14B is the same as that in the first embodiment. However, as the laser light L successively passes through the third to first light transmissive films 14d, 14c, 14b, the incident angle of the laser light L becomes successively smaller due to the difference in the refractive indices of the light transmissive films. Thus, the incident angle of the laser light L with respect to the cover plate 14a, i.e., an incident angle θ5 with respect to the front cover 2, is smaller than the incident angle θ12 in FIG. 4. In the propagation path of the laser light through air to the front cover 2 as described above, increasing the refractive index in stages makes the total reflection loss caused by Fresnel reflection at each interface smaller than the total reflection loss caused by Fresnel reflection in the case of no film coating. This in turn reduces the reflectance of the laser light L when radiated to the front cover 2 and lessens reflection loss. As a consequence, the welding efficiency at the weld interface R can be increased.

The embodiments above are described for an example of the welding method and welding apparatus of the present invention for welding together a lamp body and a front cover of a vehicle headlamp. However, the welding method and apparatus of the present invention can be a welding method and apparatus for welding together a reflector and a front lens of a lamp unit, or a welding method and apparatus for other members configuring a lamp. In other words, the present invention is applicable to any welding method and apparatus provided that the welding method and apparatus is for welding first and second members together by light irradiation. The present invention is particularly effective when applied to a welding apparatus that includes a light deflecting device and is required to radiate laser light at a large incident angle to a weld interface.

In the present invention, the light deflecting device is not limited to a light deflecting device that includes the galvano mirror of the embodiments, and it can be any light deflecting device provided that the light deflecting device has a function for deflecting and scanning light in any direction. Moreover, in the present invention, the light used for welding is not limited to laser light, and any light can be employed provided that the light includes an amount of light energy capable of welding first and second members when radiated.

The present invention can be employed in a welding method apparatus that contacts a first member with a second member, radiates light that passes through the second member to closely contacting surfaces, and welds the two members together with the closely contacting surfaces serving as a weld interface.

The invention claimed is:

1. A welding method comprising the steps of:
   contacting a light transmissive second member to a first member, and
   radiating, from a second member side, light, controlled for deflection by a light deflecting device, to contacting surfaces of said first and second members thus welding said first and second members together; wherein
   during said step of radiating the light, an incidence angle of the light when entering an outer surface of said second member is made smaller by a reflectance reducing means which is disposed on a light receiving surface side of said second member, and
   the reflectance reducing means is an incident angle adjusting step that reduces an incident angle of the light radiated to the contacting surfaces.

2. A welding apparatus comprising:
   a cover plate for pressing a light transmissive second member against a first member; and
   a light deflecting means for deflection-controlling and radiating light emitted from a light source to contacting surfaces of said first and second members from a second member side,
   the welding apparatus further comprising a reflectance reducing means for making an incidence angle of the light smaller when entering an outer surface of said second member, the reflectance reducing means being disposed on a light radiating surface side of the second member, and
   wherein the reflectance reducing means is an incident angle adjusting step that reduces an incident angle of the light radiated to the contacting surfaces.

3. The welding apparatus according to claim 2, wherein the reflectance reducing means is configured by laminating a plurality of light transmissive members with different refractive indices.

4. The welding apparatus according to claim 2, wherein the reflectance reducing means is formed in the cover plate.

5. The welding apparatus according to claim 1, wherein the reflectance reducing means is formed in the cover plate.

6. The welding apparatus according to claim 3, wherein the reflectance reducing means is formed in the cover plate.

* * * * *